United States Patent [19]

Uomori et al.

[11] Patent Number: 4,984,074
[45] Date of Patent: Jan. 8, 1991

[54] MOTION VECTOR DETECTOR

[75] Inventors: Kenya Uomori, Katano; Atsushi Morimura, Nara, both of Japan

[73] Assignee: Matsushita Electric Industrial Co., Ltd., Osaka, Japan

[21] Appl. No.: 492,742

[22] Filed: Mar. 13, 1990

[30] Foreign Application Priority Data

Mar. 20, 1989 [JP] Japan .................... 1-068207

[51] Int. Cl.⁵ .................................... H04N 7/18
[52] U.S. Cl. ................................ 358/105; 358/136; 358/167
[58] Field of Search ............... 358/105, 136, 167

[56] References Cited

U.S. PATENT DOCUMENTS

| | | | |
|---|---|---|---|
| 4,242,705 | 12/1980 | Ebihara | 358/167 |
| 4,561,022 | 12/1985 | Bayer | 358/167 |
| 4,661,849 | 4/1987 | Hinman | 358/105 |
| 4,691,230 | 9/1987 | Kaneko | 358/105 |
| 4,851,906 | 7/1989 | Koga | 358/136 |
| 4,862,259 | 8/1989 | Gillard | 358/105 |
| 4,862,264 | 8/1989 | Wells | 358/105 |
| 4,890,160 | 12/1989 | Thomas | 358/105 |
| 4,924,310 | 5/1990 | von Brandt | 358/105 |

OTHER PUBLICATIONS

Takahiko Fukinuki, "Multi-Dimensional Signal Processing of TV Picture", The Nikkan Kogyo Shinbun Ltd., pp. 201-207.
IEEE Trans COM-30, 1, pp. 201-211.

Primary Examiner—Howard W. Britton
Assistant Examiner—Sherrie Hsia
Attorney, Agent, or Firm—Stevens, Davis, Miller & Mosher

[57] ABSTRACT

A motion vector detector includes a motion vector computing circuit for achieving a computation of a motion vector associated with an input image signal, an integrator circuit for integrating the motion vector, a coring value decision circuit for deciding a coring value based on an output from the integrator circuit, and a coring circuit of which a coring value is controlled by an output from the coring decision circuit and which accomplishes a coring operation on an output from the motion vector computing circuit.

3 Claims, 12 Drawing Sheets

F I G. 1
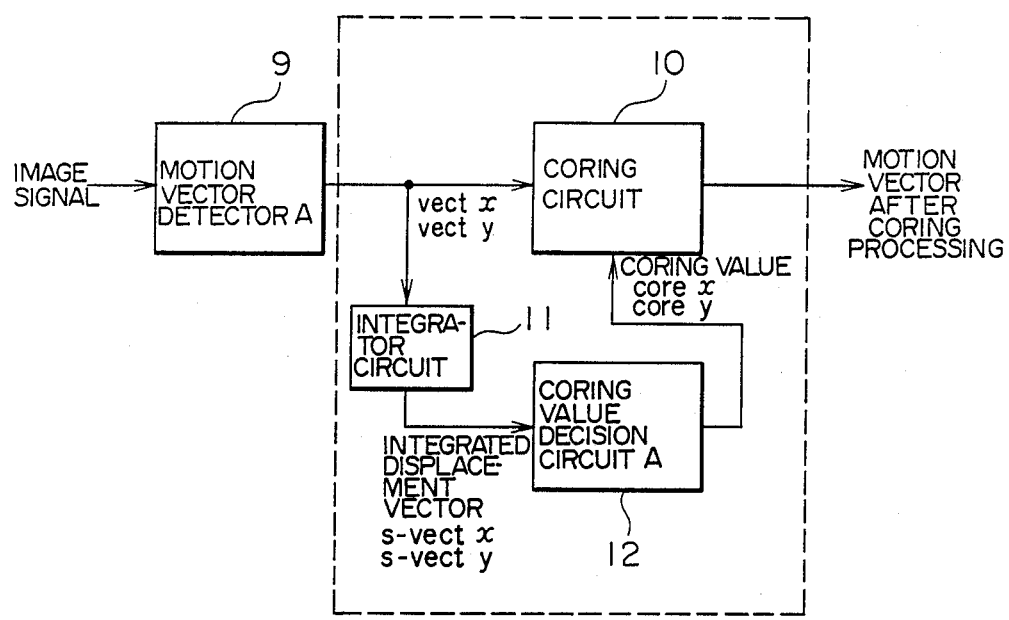
F I G. 2
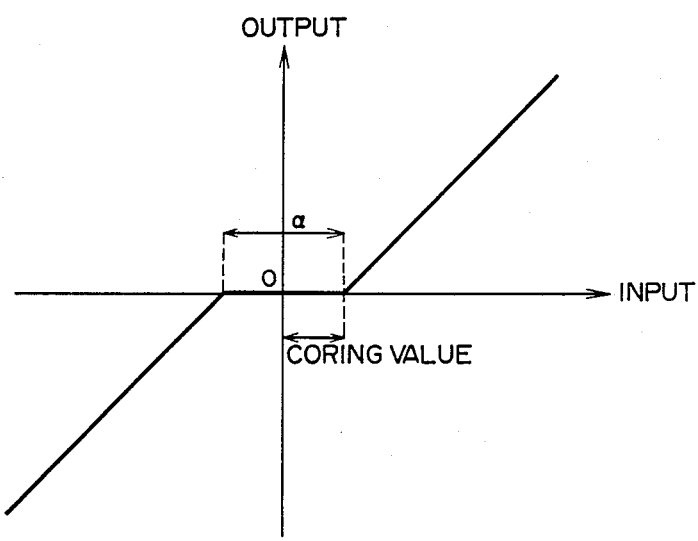

CORING VALUE ATTENUATION CHARACTERISTIC I

CONFIGURATION ATTAINING CORING VALUE ATTENUATION CHARACTERISTIC I

CORING VALUE ATTENUATION CHARACTERISTIC 2

CONFIGURATION ATTAINING CORING VALUE ATTENUATION CHARACTERISTIC 2

CORING VALUE ATTENUATION CHARACTERISTIC

OFFSET AND UPPER CLIPPING VALUE CONTROL METHOD

CORING VALUE ATTENUATION CHARACTERISTIC 3

CONFIGURATION ATTAINING CORING ATTENUATION CHARACTERISTIC 3

FIG. IIA
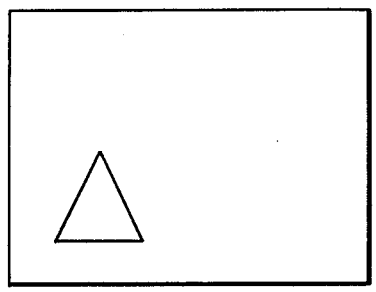
PARALLEL MOTION OF IMAGE DUE TO MOVEMENT OF IMAGING DEVICE
FIG. IIB
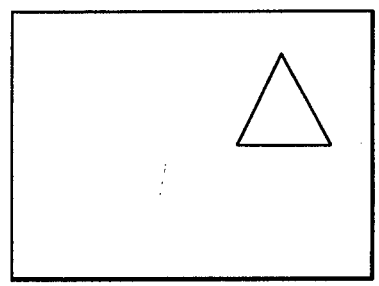
FIG. IIC
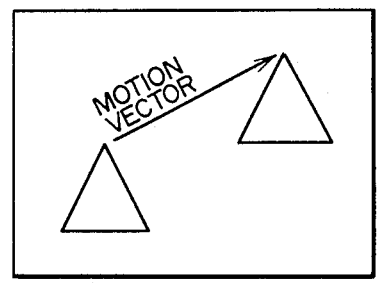

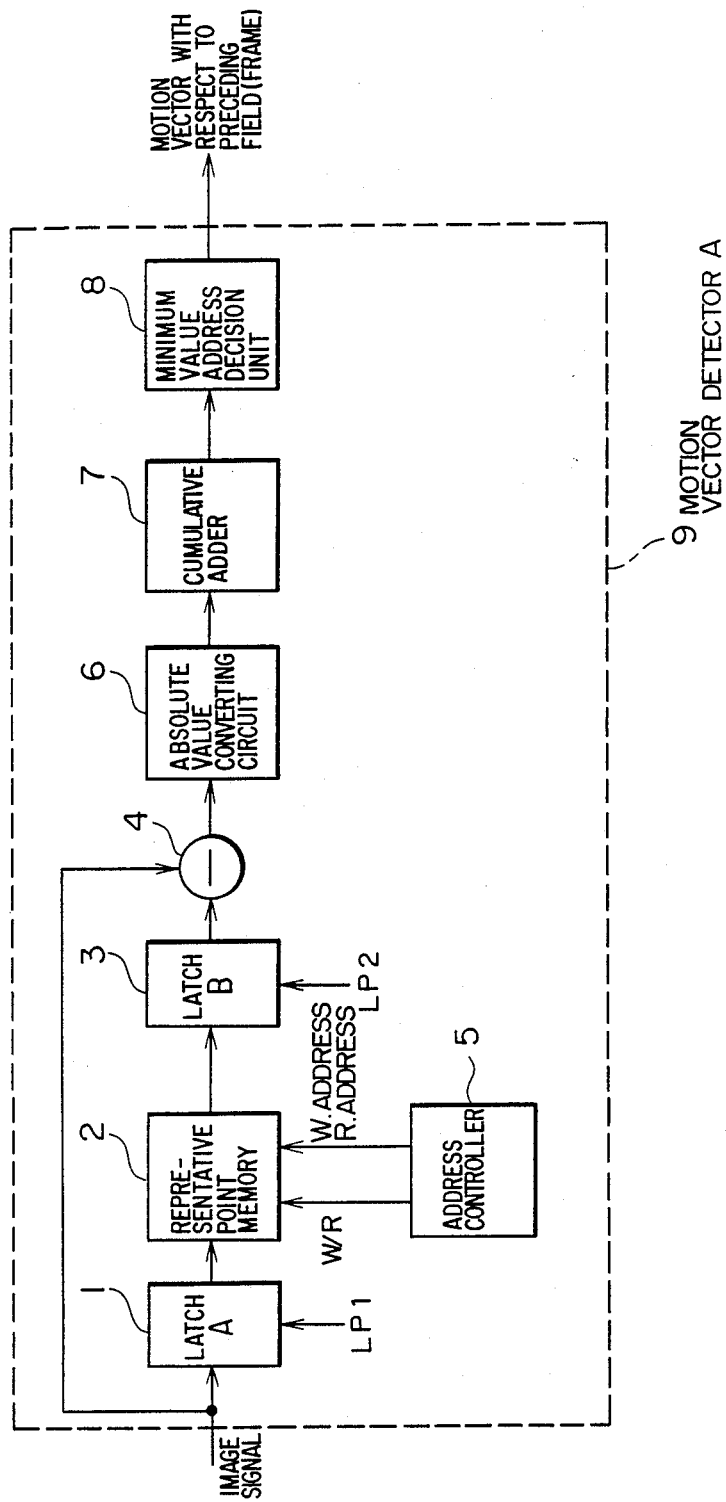

MOTION VECTOR DETECTOR

BACKGROUND OF THE INVENTION

The present invention relates to a motion vector detector for detecting an amount of motion or movement of an image.

As a conventional example, an image motion vector detector utilizing a correlation computing apparatus has been described, for example, in the JP-A-61-269475.

FIG. 12 shows a schematic diagram of the vector detector including a correlation computing unit which adopts a computation of an absolute value of a difference. This system includes a latch-A or D flip-flop 1, a representative point memory 2, a latch-B or D flip-flop 3, a subtractor 4 (which may be replaced with an adder), an address controller 5, an absolute value converting circuit 6, a cumulative adder 7, and a minimum value address decision circuit 8. $LP_1$ and $LP_2$ designate latch pulses or clock pulses inputted to latch-A1 and latch-B3, respectively.

A description will now be given of an image motion vector detector adopting the conventional correlation computing unit thus configured.

First, the motion vector of an image will be described. In FIG. 11, a portion (a) shows an image at a point of time, whereas a portion (b) is an image obtained after a field or a frame. As can be seen from these figures, when an image undergoes a parallel motion, for example, by a movement of an image pickup device or an imaging device, a vector is employed to represent an amount of the motion of the image as indicated by a arrow. This vector is called a motion or movement vector.

FIG. 13 shows representative points and pixels in the vicinity thereof in a representative point matching method. This method is not commonly used when detecting a motion vector of the image above. In the detection, image data at positions of representative points in a field are checked to determine destination positions associated with pixels around representative points in the next field, thereby detecting a motion vector.

Referring next to FIGS. 12 and 13, a description will be given of an image motion vector detector using the conventional correlation computing apparatus. Image data at respective points on the screen are acquired at a timing pulse LP1 into the latch-A1 so as to be storing at an appropriate timing in the representative point memory 2 at addresses associated with the respective representative points. Thereafter, in the subsequent field or frame, a difference is computed between image data in a motion vector detection area around the position of each representative point and the image data of the preceding field previously stored in the representative point memory 2. The difference is fed to the absolute value converting circuit 6 so as to produce an absolute value thereof. The resultant absolute value is delivered to the cumulative adder 7. The adder 7 cumulatively add data (output from the absolute value converting circuit) obtained as an absolute difference value for each location having the same coordinate position with reference to the pertinent representative point. When the cumulative addition is finished for the locations of all representative points, the minimum value address decision unit 8 decides a location for which the cumulative adder 7 develops a minimum value of the cumulatively added values. In the correlation judgement depending on the absolute value of the difference, since the smaller value is obtained for locations having the greater correlation, a position (an address) associated with the minimum value with reference to the position (address) of the representative point is obtained as the motion vector.

Since the operation above is carried out for each field or frame, the latch-A 1 is disposed to retain image data at representative points in the next field or frame while achieving the correlation computation. In addition, the latch-B 3 is employed to keep image data of representative points when correlation is determined between image data of a representative point and image data of the periphery of the point. Moreover, a portion enclosed by the broken lines in FIG. 12, namely, an apparatus to attain the motion vector is called a motion vector detector A9.

However, in the configuration above, due to a noise component of an input image signal, a noise is slightly included in the motion vector thus detected by the detector. This leads to a problem that a small motion vector occur also in a still image input.

SUMMARY OF THE INVENTION

It is therefore an object of the present invention to provide a motion vector detector in which a large motion vector is detected without reducing the precision of detection and in which when a small motion vector is detected, the small noise component of the detected motion vector is suppressed, thereby removing the problems above.

According to the present invention, there is provided a motion vector detector comprising a motion vector computing circuit for achieving a computation of a motion vector associated with an input image signal, an integrator circuit for integrating the obtained motion vector, a coring value decision circuit for deciding a coring value based on an output from said integrator circuit, and a coring circuit of which a coring value is controlled by an output from said coring decision circuit and which accomplishes a coring operation on an output from said motion vector computing circuit.

Furthermore, according to the present invention, there is provided a motion vector detector in which said coring value decision circuit decides a coring value based on a mean luminance level of the input image signal or on a gain of an automatic gain control (AGC) circuit.

In accordance with the present invention, with the provision of the configuration above, a motion vector thus detected undergoes a coring operation in association with a magnitude of the detected motion vector. As a result, a large motion vector is detected without minimizing the detection precision and when a small motion vector is detected, the small noise component of the detected motion vector is suppressed.

BRIEF DESCRIPTION OF THE DRAWINGS

These and other objects and advantages of the present invention will become apparent by reference to the following description and accompanying drawings wherein:

FIG. 1 is a schematic diagram showing the configuration of a motion vector detector as a first embodiment according to the present invention;

FIG. 2 is a graph showing an input/output characteristic of coring processing;

FIGS. 11A to 11C are diagrams useful to explain a motion vector of an image;

FIG. 12 is a diagram showing the constitution of a conventional motion vector detector.

DESCRIPTION OF THE PREFERRED EMBODIMENTS

FIG. 1 is a configuration diagram of a motion vector detector as a first embodiment according to the present invention. This system includes a motion vector detector A9, a coring circuit 10, an integrator circuit 11, and a coring value decision circuit A12.

A description will now be given of operations of the motion vector detector thus configured.

First, coring processing will be described. FIG. 2 shows an input/output characteristic of the coring circuit 10. Here, as can be seen from this graph, the term "coring processing or operation", is referred to as a processing or operation that an output becomes zero, which corresponds to an infinitesimal component of an input signal, namely, a portion α of FIG. 2. In general, since the noise component level is small in the signal, the coring processing is adopted to remove the small noise component from the signal. However, since the small variation component of the input signal may also include an inherent signal component, it is to be feared that when the coring amount is increased in FIG. 2, the change of the signal component becomes to be excessive.

Next, a description will be given of the operation of the motion vector detector of FIG. 1. In this constitution, the motion vector detector or detecting circuit a 9 produces a motion vector (vect x in the x direction and vect y in the y direction) for each field or frame and then delivers the vector to the integrator circuit 11 and the coring circuit 10. The motion vector including vect x and vect y is a vector represented with reference to the previous field. Namely, a motion vector with respect to an initial value can be attained by integrating the vector above. In this operation, although the complete integration may be conducted, in order to avoid a saturation of a signal at an occurrence of offset, there is used the incomplete integration in which the signal is not entirely processed. The motion vector (s_vect x, s_vect y) thus integrated by the integrator circuit 11 is fed to the coring value decision circuit A12. At this point, the motion vector (s_vect x, s_vect y) represents an amount of motion of the image with respect to the initial value. Based on the motion vector, the coring value decision circuit A12 determines a coring value (core x, core y) and then supplies the value to the coring circuit 10. The coring circuit 10 achieves a coring processing on the received motion vector (vect x, vect y) by use of the coring value (core x, core y) so as to produce a motion vector. As a result, the noise component is removed from the motion vector.

Figure 3A:
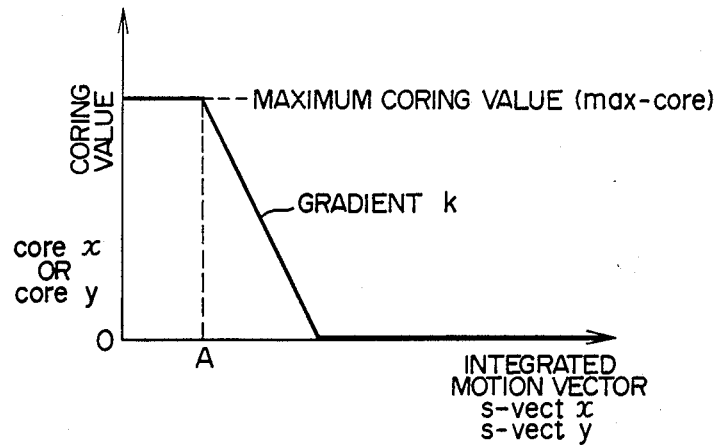
FIGS. 3A, 3B, 4A and 4B are diagrams showing coring value attenuation characteristics and configurations of the first and third embodiments according to the present invention.

In the processing above, in order to prevent the coring operation from removing a signal component inherent to the motion vector, the characteristic of the coring value decision circuit A12 is established as shown in FIG. 3A. That is, the characteristic is set as indicated by a curve of FIG. 3A. By decreasing the coring value as the integrated motion vector is increased as shown here, in an area in which a considerable fluctuation due to the noise component appears in the detected motion vector, namely, in an area in which the integrated motion vector is small, the system primarily achieves the noise removal with the reduced coring amount. In contrast thereto, in an area in which the fluctuation due to the noise component is not excessive in the detected motion vector, namely, in an area in which the integrated motion vector is great, the system sets a small coring amount to reduce an error in the detected motion vector, thereby minimizing the signal component removed by the coring processing.

Figure 3B:
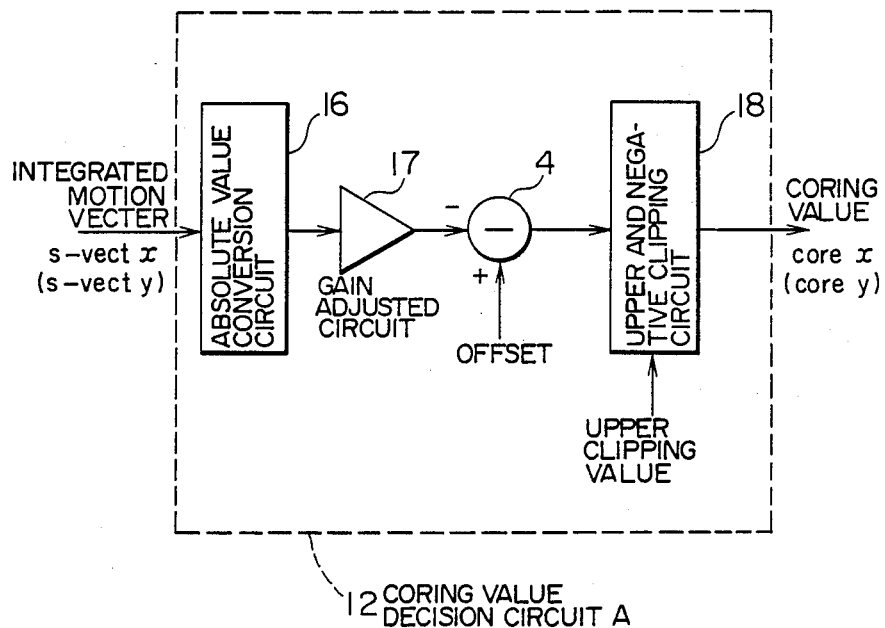

In FIG. 3B, there is shown the configuration of the coring value decision circuit A12 in which the attenuation characteristic of the coring value is attained as described above.

Namely, the integrated motion vector is processed to attain an absolute value thereof such that the gain is adjusted and then a subtraction is conducted on the resultant value by use of a predetermined offset value so as to achieve upper and negative clipping operations, thereby attaining the coring value attenuation characteristic shown in FIG. 3A. In this system, the gradient k of FIG. 3A, the value of A, and the maximum coring value (max_core) can be adjusted by use of the gain of the gain adjuster circuit 17, the offset value, and the upper clipping value, respectively.

Figure 4A:
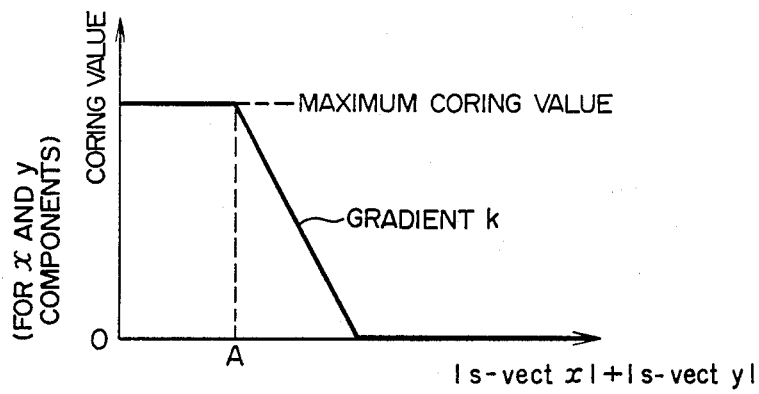
Figure 4B:
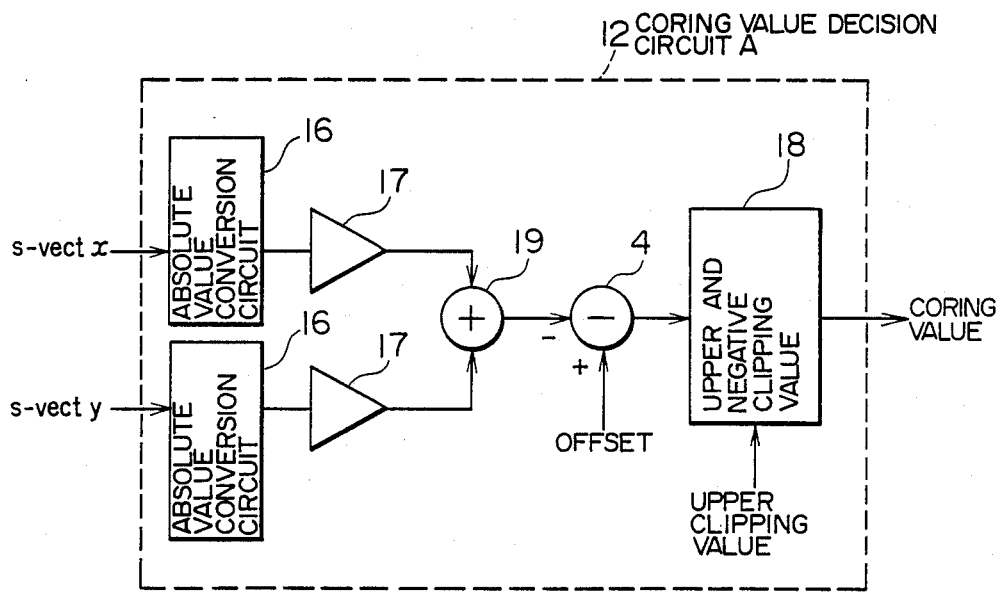

Furthermore, although the coring operation is achieved for the x and y components in an independent fashion in FIG. 3A and FIG. 3B, there may be considered a method in which as shown in FIG. 4A, the x and y components of the coring value are set to the same value such that based on the value of the magnitude of an integrated motion vector |s_vect x| + |s_vect y| obtained in consideration of both of the x and y components, the coring value is determined. With this provision, in a case where the image motion vector draws a circle with respect to time, the detection error of the motion vector is also smooth since the error varies in a shape of a circle with respect to time. In the method of FIG. 3A and FIG. 3B, the error varies in a rectangular shape with lapse of time and hence the smoothness is lost. The method above can prevent the disadvantageous feature. FIG. 4B shows the constitution of a coring value decision circuit A12 for attaining the coring value attenuation characteristic of this kind. In this system, the integrated motion vectors (s—vect x, s—vect y) are processed to obtain absolute values thereof. After a gain adjustment, the resultant values are added so as to conduct a subtraction with respect to an offset value. The obtained value is then subjected to clipping operations respectively with upper and negative clipping values, thereby determining the coring value. Furthermore, like in the case of FIG. 3A and FIG. 3B, by adjusting the gain of the gain adjuster circuit 17, the offset value, and the upper clipping value, it is possible to regulate the gradient k of FIG. 4A, the integrated motion vector value A and the maximum coring amount, respectively.

In accordance with the embodiment, as described above, by controlling the coring value by use of the coring value decision circuit A12, in an area in which a considerable fluctuation due to the noise component appears in the detected motion vector, namely, in an area in which the integrated motion vector is small, the system primarily achieves the noise removal. In contrast thereto, in an area in which the fluctuation due to the noise component is not clearly perceived in the detected motion vector, namely, in an area in which the integrated motion vector is great, the system minimizes the signal component removed by the coring processing to reduce the error in the detected motion vector. As a result, the detection precision is not lowered when a large motion vector is detected; whereas the infinitesimal noise component of the detected motion vector is suppressed when a small motion vector is detected.

Figure 5:
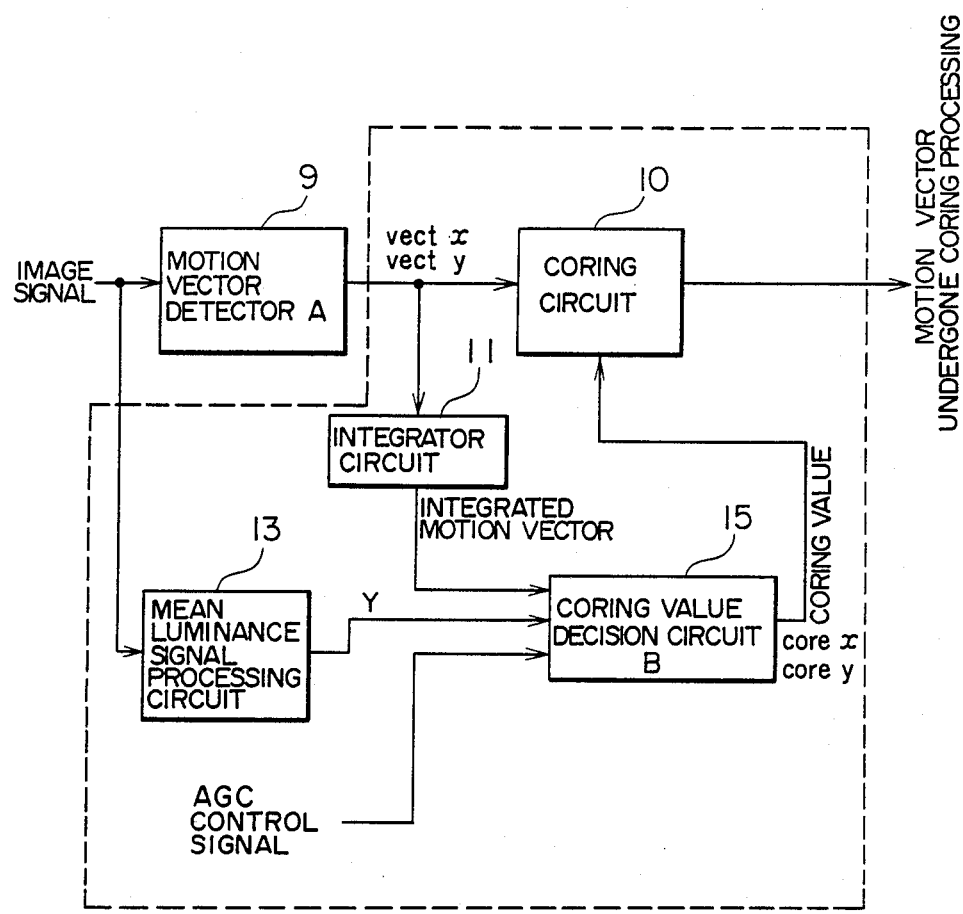
FIG. 5 is a diagram schematically showing the configuration of a motion vector detector as a second embodiment according to the present invention.

FIG. 5 is a configuration diagram of a motion vector detector as a second embodiment according to the present invention. The system includes a motion vector detector A9, a coring circuit 10, and an integrator circuit 11, which are identical to those shown in the first embodiment. In addition, the configuration comprises a mean luminance signal processing circuit 13 and a coring value decision circuit B15. This apparatus constitution differs from the first embodiment in that the coring value decision circuit B 15 receives as inputs thereto, in addition to the integrated motion vector (s—vect x, s—vect y), a luminance signal Y and an AGC control signal.

A description will be given of the operation achieved by the motion vector detector of FIG. 5. A movement or motion vector (vect x in the x direction, vect y in the y direction) obtained through the motion vector detector A 9 is fed to the integrator circuit 11 and the coring circuit 10. The vector (vect x, vect y) here is represented with the previous field set as the reference, namely, the motion vector with respect to the initial value is attained by integrating the motion vector above. The motion vector (s—vect x, s—vect y) produced by integrating the received vector in the integrator circuit 11 is supplied to the coring value decision circuit A 12. The integrated motion vector (s—vect x, s—vect y) thus attained represents an amount of movement or motion of the image relative to the initial value. Based on the integrated motion vector, an output from the mean luminance signal processing circuit 13, and the AGC control signal, the coring value decision circuit B 15 determines a coring value (core x, core y) so as to input the value to the coring circuit 10. In this circuit 10, the input motion vector (vect x, vect y) is subjected to the coring processing in association with the coring value (core x, core y), thereby obtaining a motion vector free from the noise component.

Subsequently, the operation of the coring value decision circuit B 15 will be described.

The operation is conducted in the similar fashion as that of the first embodiment. In this apparatus, however, when the mean luminance signal on the screen is low and when the AGC circuit of the imaging device operates due to darkness of an object so as to increase the gain of the circuit system and hence the signal-to-noise (S/N) ratio of the image is deteriorated, namely, in a state where a considerably large fluctuation appears due to a noise in the detected motion vector of an image, the coring value is increased to greatly suppress the noise component of the obtained motion vector. As a result, the fluctuation of the detected motion vector associated with the noise is suppressed.

Figure 6A:
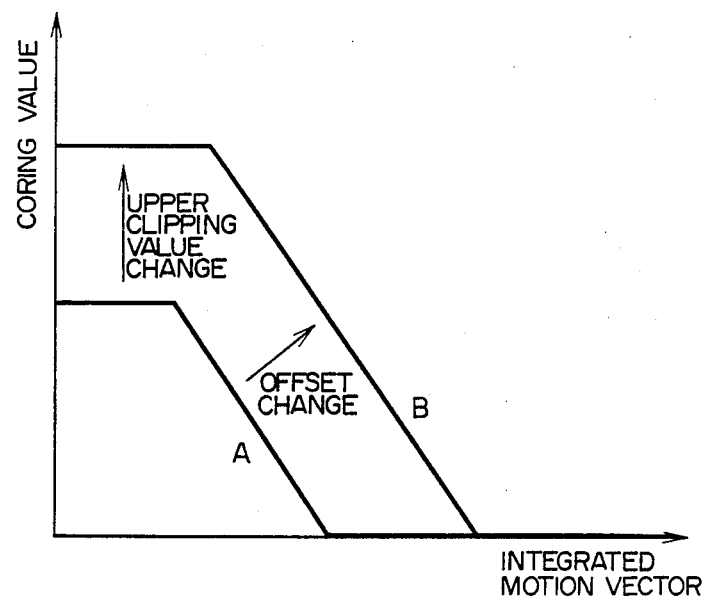
FIGS. 6A and 6B are diagrams showing a coring value attenuation characteristic and the configuration of the second and fourth embodiments according to the present invention.

FIG. 6A shows an operational characteristic of the coring value decision circuit B 15. When the mean luminance signal is sufficiently great or when the object is satisfactorily bright and hence the gain of the AGC circuit of the imaging device is not increased, the operation is carried out with the characteristic A of the first embodiment. However, as the mean luminance signal becomes smaller and the gain of the AGC circuit is increased, the upper clipping value and the offset value are increased, thereby developing a characteristic B. Namely, when the mean luminance is lowered and the gain of the AGC circuit becomes greater, the coring value to be effected on the detected motion vector is gradually increased. In consequence, the zone of the integrated vector to be subjected to the coring processing is broadened.

Figure 6B:
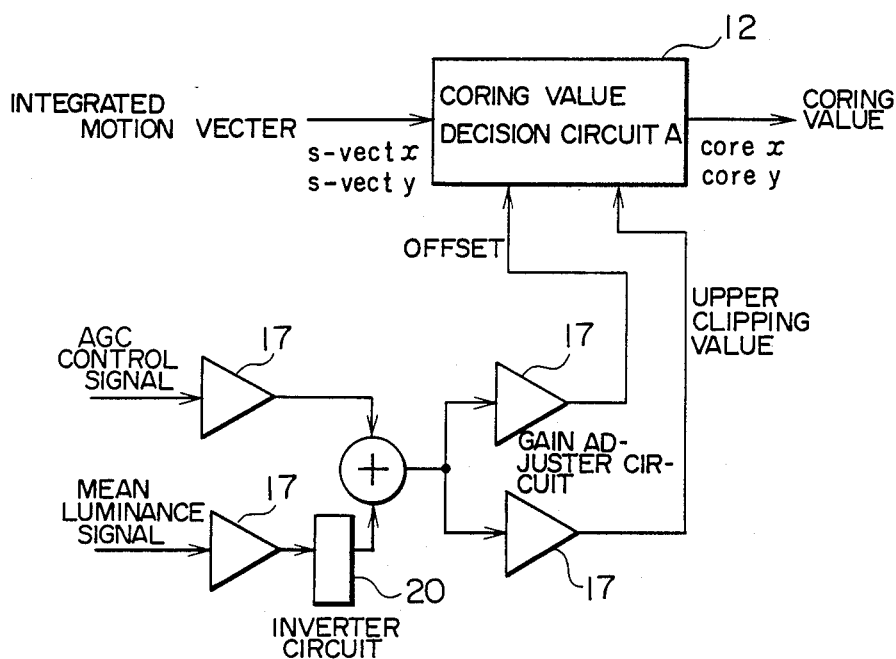

The configuration to attain the coring value attenuation characteristic of FIG. 6A is shown in FIG. 6B. In this system, the offset and upper clipping values of the coring value decision circuit A 12 of the first embodiment are controlled depending on the AGC control signal and the mean luminance signal. A gain adjustment is carried out for the mean luminance signal produced from the mean luminance signal processing circuit 13. The attained signal is inverted through an inverter circuit 20 (in which a negative correlation exists between an input and an output). The inverted signal is added to the AGC control signal (which takes the larger value for the greater gain of the AGC circuit) undergone the gain adjustment. The sum of these signals is then subjected to a gain adjustment, thereby producing the offset and the upper clipping value.

As described above, in accordance with this embodiment, when the mean luminance is lowered or when the object is dark and hence the gain of the AGC circuit of the imaging device is increased so as to deteriorate the S/N ratio of the image signal, the fluctuation of the detected motion vector due to the noise component can be suppressed while minimizing the error in the detected motion vector.

Figure 7:
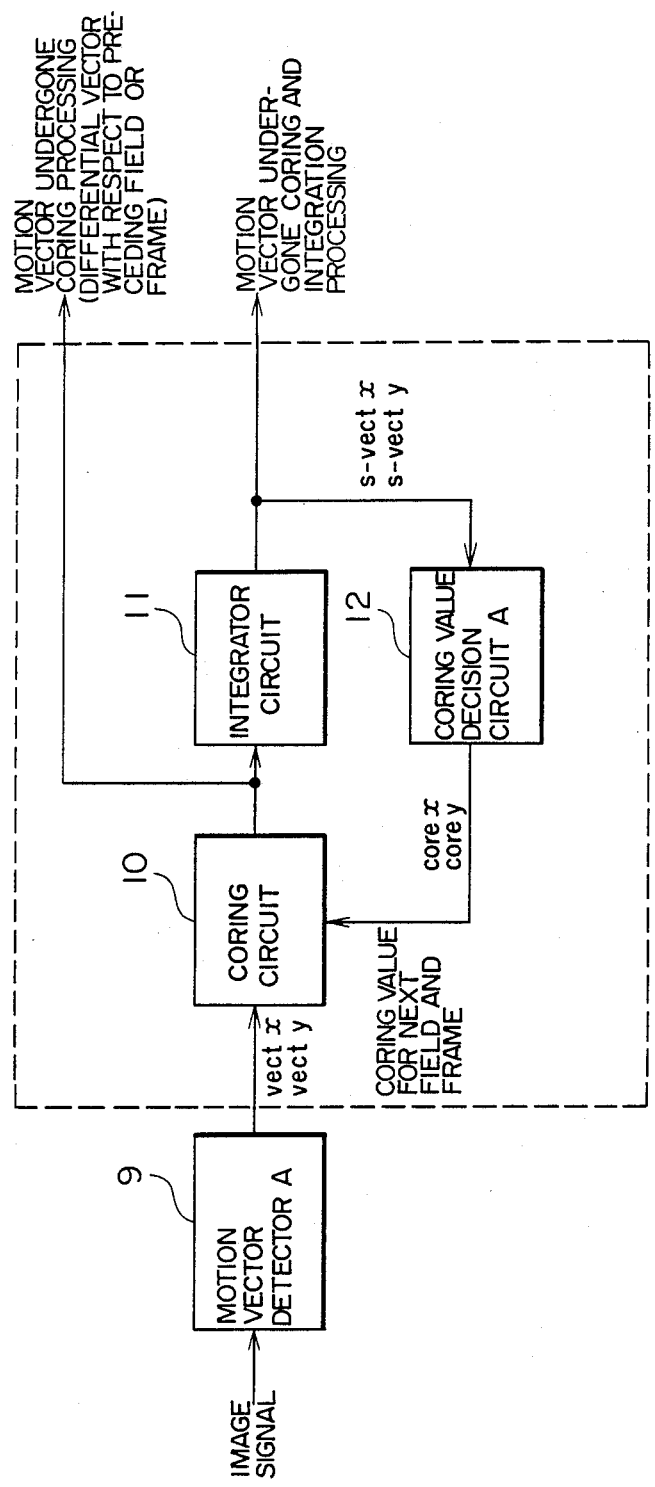
FIG. 7 is a diagram schematically showing the configuration of a motion vector detector as a third embodiment according to the present invention.

FIG. 7 is a configuration diagram of a motion vector detector as a third embodiment in accordance with the present invention. The system includes a motion vector detector A 9, a coring circuit 10, an integrator circuit 11, and a coring value decision circuit A 12. Which are idential to those shown in the first embodiment (FIG. 1).

This apparatus constitution differs from the first embodiment (FIG. 1) with respect to the connecting method of the coring circuit 10, the integrator circuit 11, and the coring value decision circuit A 12. Namely, based on an integrated vector attained by integrating the data undergone the coring processing, the coring value is determined for a detected vector of the next field or frame.

Next, a description will be given of the motion vector detector of the third embodiment thus constituted.

The motion vector detector A 9 produces a motion vector (vect x in the x direction, vect y in the y direction) for each field or frame so as to supply the vector to the coring circuit 10. The detected motion vector is subjected to the coring processing and is then integrated by the integrator circuit 11 to create an integrated motion vector (s_vect x, s_vect y). The integrated motion vector (s_vect x, s_vect y) represents here a motion amount of the image relative to the initial value. Based on the resultant integrated motion vector, the coring value decision circuit A 12 determines a coring value (core x, core y) for a motion vector detected in the next field or frame and then sends the coring value to the coring circuit 10. In the coring circuit 10, the detected motion vector (vect x, vect y) of the subsequent field or frame undergoes the coring processing based on the coring value (core x, core y) so as to produce a motion vector. As a result, the motion vector free from the noise component is obtained.

Moreover, the coring value decision circuit A 12 carries out completely the same operation as the associated circuit of the first embodiment (FIGS. 3A, 3B and FIGS. 4A, 4B). Namely, according to the operation characteristic, as the magnitude of the integrated motion vector becomes greater, the coring value is reduced.

As above, in the constitution of this embodiment, although the decision of the coring value is attended with a time delay equivalent to one field or frame, in addition to the motion vector of an image associated with a preceding field or frame undergone the coring processing, the motion vector with respect to the initial value subjected to the coring processing and integration can be obtained at the same time.

Figure 8:
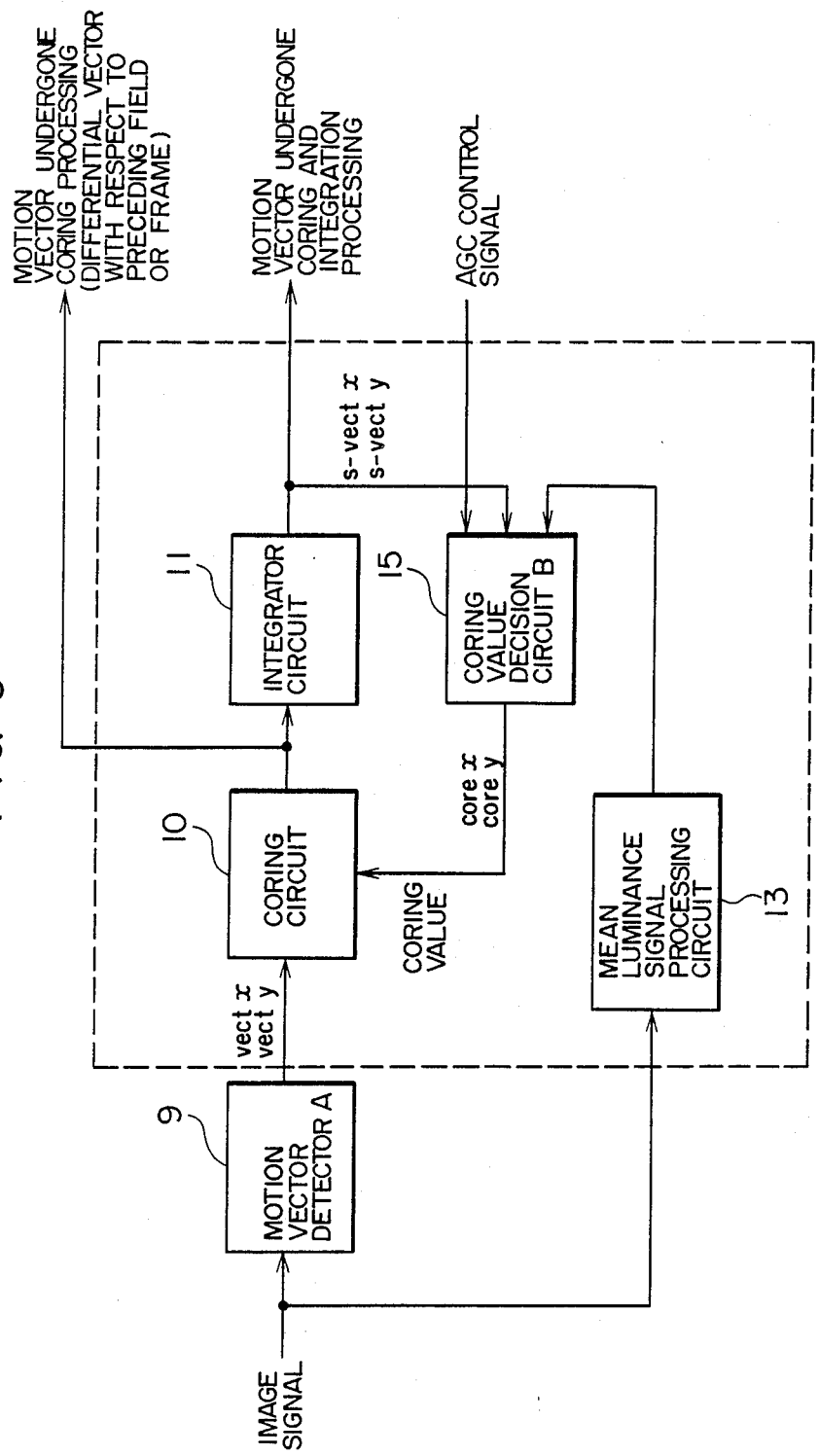
FIG. 8 is a diagram schematically showing the configuration of a motion vector detector as a fourth embodiment according to the present invention.

FIG. 8 is a configuration diagram of a motion vector detector in the fourth embodiment according to the present invention. This system includes a motion vector detector A 9, a coring circuit 10, an integrator circuit 11, a mean luminance signal processing circuit 13, and a coring value decision circuit B 15. The constituent elements are identical to those of the second embodiment.

This apparatus constitution differs from the second embodiment (FIG. 5) with respect to the connecting method of the coring circuit 10, the integrator circuit 11, the mean luminance signal processing circuit 13, and the coring value decision circuit B 15. Namely, by use of an integrated vector attained by integrating the data undergone the coring processing, the coring value is determined for a detected vector of the next field or frame.

Next, a description will be given of the motion vector detector of the fourth embodiment thus constituted.

A motion vector (vect x in the x direction, vect y in the y direction) generated by the motion vector detector A 9 is supplied to the coring circuit 10. The detected motion vector is subjected to the coring processing and is then integrated by the integrator circuit 11 to create an integrated motion vector (s_vect x, s_vect y). The integrated motion vector (s_vect x, s_vect y) represents here a motion amount of the image relative to the initial value. Based on the resultant integrated motion vector, an output from the mean luminance signal processing circuit 13, and the AGC control signal, the coring value decision circuit B 15 determines a coring value (core x, core y) for a motion vector detected in the next field or frame and then sends the coring value to the coring circuit 10. In the coring circuit 10, the detected motion vector (vect x, vect y) of the subsequent field or frame undergoes the coring processing based on the coring value (core x, core y) so as to produce a motion vector. As a result, the noise component is removed from the motion vector.

In addition, the coring value decision circuit B 15 conducts completely the same operation as the associated circuit of the second embodiment (FIG. 6). Namely, according to the operation characteristic, as the magnitude of the integrated motion vector becomes greater, the coring value is reduced. However, when the mean luminance signal has a low level or when the object is dark and the gain of the AGC circuit of the imaging device is increased and hence the gain of the circuit system becomes greater and the S/N ratio of the image signal is deteriorated, the coring value is increased. Moreover, the area of the integrated vector to be subjected to the coring operation is broadened.

As described above, in the constitution of this embodiment, although the decision of the coring value is attended with a time delay equivalent to one field or frame, not only the motion vector of an image associated with a preceding field or frame undergone the coring processing but also the motion vector with respect to the initial value subjected to the coring processing and integration can be obtained at the same time.

Figure 9:
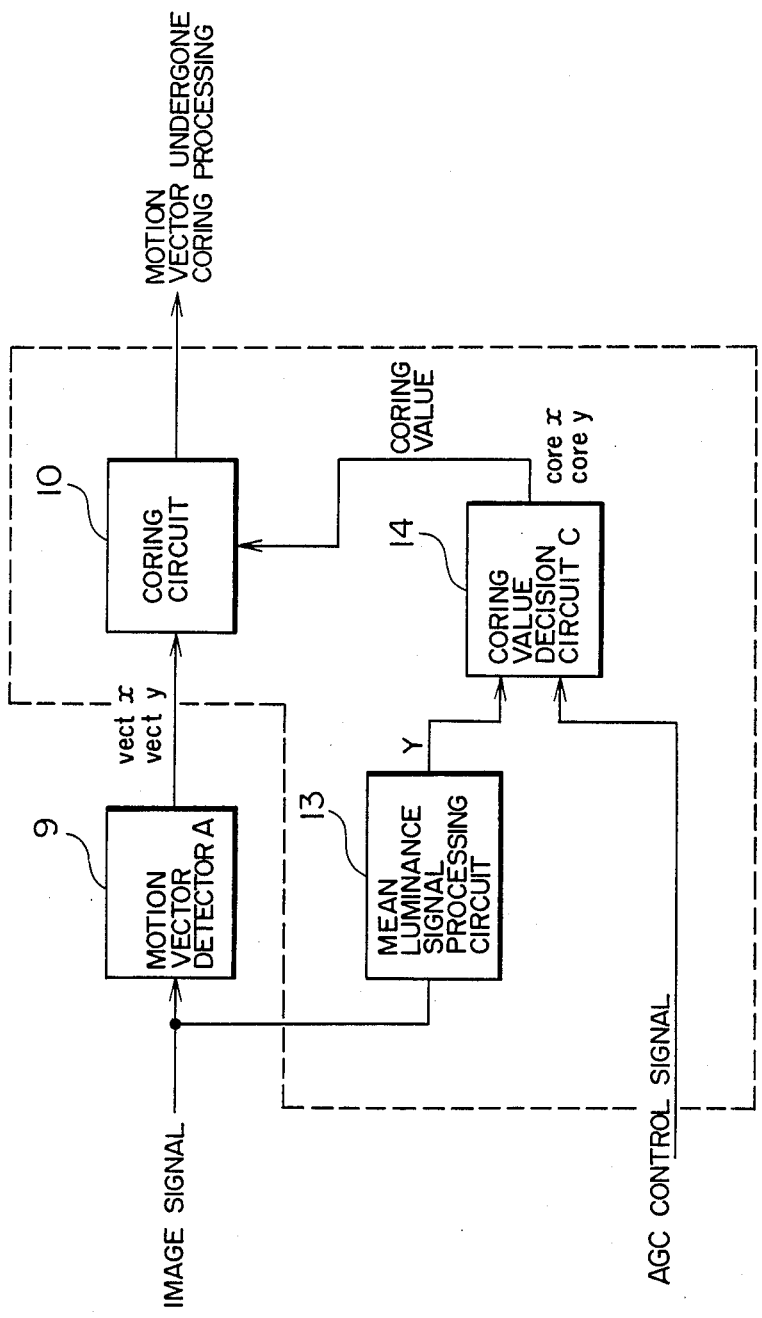
FIG. 9 is a diagram schematically showing the configuration of a motion vector detector as a fifth embodiment according to the present invention.

FIG. 9 is a configuration diagram of a motion vector detector in the fifth embodiment according to the present invention. This system includes a motion vector detector A 9, a coring circuit 10, an integrator circuit 11, a mean luminance signal processing circuit 13, and a coring value decision circuit C 14. This embodiment is different from the first to fourth embodiments in that the integrated motion vector is not employed in the coring value decision.

Next, a description will be given of the operation of the motion vector detector thus constituted.

A motion vector (vect x in the x direction, vect y in the y direction) created by the motion vector detector A 9 is supplied to the coring circuit 10. The detected motion vector is subjected to the coring processing such that the infinitesimal noise component is removed therefrom.

The coring value to be adopted in the coring circuit 10 is produced by the coring value decision circuit C 14 based on the output from the mean luminance signal processing circuit 13 and the AGC control signal.

Figure 10A:
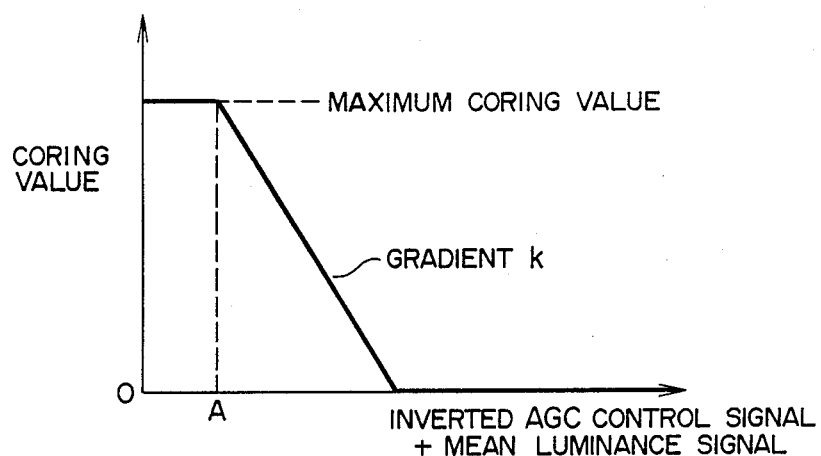
FIGS. 10A and 10B are diagram showing a coring value attenuation characteristic and the configuration of the fifth embodiment according to the present invention.

FIG. 10A shows an operation characteristic of the coring value decision circuit C 14. As shown here, when the mean luminance signal is small or the AGC control signal (which is greater when the gain of the AGC circuit is larger) is great and hence the S/N ratio of the image signal is deteriorated, the coring value is set to a higher value, thereby suppressing the noise component of the detected motion vector. In contrast thereto, when the mean luminance signal is large or the AGC control signal is small and hence the S/N ratio of the image signal is satisfactory, the coring value is set to a lower value, thereby minimizing the error in the detected motion vector.

Figure 10B:
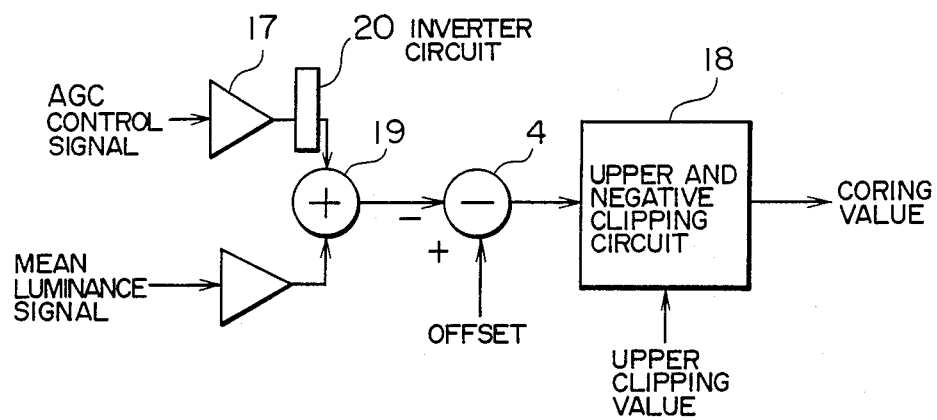
Figure 13:
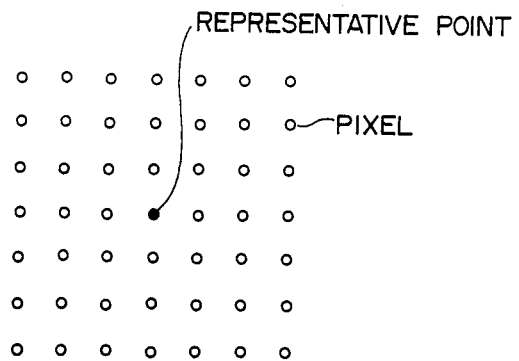
FIG. 13 is a schematic diagram for explaining a representative point and pixels around the point used in the representative matching method.

FIG. 10B shows the configuration of the coring value decision circuit C 14 for obtaining the coring value attenuation characteristic 3 of FIG. 10A.

In FIG. 10B, an AGC control signal undergone a gain adjustment and inverted by an inverter circuit 20 is added, by means of an adder 19, to a mean luminance signal after gain adjustment. The resultant signal is then subtracted from a predetermined offset value and thereafter subjected to the upper clipping and negative clipping operations so as to produce a coring value. In this configuration, by adjusting the offset value, the upper clipping value, and the gain of the gain adjuster circuit 17, the system can adjust the position of point A, the maximum coring value, and the gradient k in FIG. 10A.

In the respective embodiments above, the constituent elements commonly used are assigned with the same reference numerals.

As described above, according to the embodiment, when the mean luminance signal is small or the AGC control signal is great and hence the S/N ratio of the image signal is deteriorated, the coring value is set to a higher value, thereby suppressing the noise component of the detected motion vector. In contrast thereto, when the mean luminance signal is large or the AGC control signal is small and hence the S/N ratio of the image signal is satisfactory, the coring value is set to a lower value, thereby minimizing the error in the detected motion vector.

Incidentally, in the second and fourth embodiments, the gain-adjusted AGC signal is added to an inverted signal of the mean luminance signal so as to control the offset and upper clipping values (FIG. 6). However, it may also be possible to employ the larger one of the gain-adjusted AGC signal and the mean luminance signal. Moreover, the operation above may be conducted by use of either one of the AGC signal and the mean luminance signal. In addition, although the offset and upper clipping values are simultaneously controlled, it may also be possible to control only one of the offset and upper clipping values.

Furthermore, in the fifth embodiment, the AGC control signal after the gain adjustment is added to the inverted signal of the mean luminance signal to control the offset and upper clipping values (FIG. 10); however, either larger one of the AGC control signal after the gain adjustment and the inverted signal of the mean luminance signal may also be used. Moreover, either one of the AGC signal and the mean luminance signal may be employed.

In addition, in the first to fifth embodiments, the content of the operation achieved by the motion vector detector A is a motion vector detection in the representative point matching method of the conventional example (FIG. 12). However, the motion vector detector may employ other detection methods (e.g. a gradient method).

Moreover, althogh a mean luminance signal is used in the second, fourth, and fifth embodiments, any signal indicating a mean luminance level of the screen e.g. a color signal may be possibly employed.

Furthermore, in FIGS. 1, 5, 7, 8, and 9, the signal processing is carried out in a digital system; consequently, by supplying the detected motion vector (vect x, vect y) to a microcomputer, the processing enclosed in the broken lines can be easily accomplished through computations in the microcomputer.

In accordance with the present invention as described above, depending on the magnitude of the detected motion vector or on the S/N ratio of the input image signal, the coring processing can be achieved on the detected motion vector by use of an appropriate coring value. As a result, while minimizing the increase of the detection error, the infinitesimal noise component can be suppressed in the detected motion vector.

We claim:

1. A motion vector detector comprising:
   a motion vector computing circuit for achieving a computation of a motion vector associated with an input image signal;
   an integrator circuit for integrating the motion vector;
   a coring value decision circuit for deciding a coring value based on an output from said integrator circuit; and
   a coring circuit of which a coring value is controlled by an output from said coring decision circuit and which accomplishes a coring operation on an output from said motion vector computing circuit.

2. A motion vector detector according to claim 1 wherein said coring value decision circuit changes at least either one of a maximum coring value or a coring value based on a mean luminance level of the input image signal or on a gain of an AGC circuit.

3. A motion vector detector comprising:
   a motion vector computing circuit for achieving a computation of a motion vector associated with an input image signal;
   a coring value decision circuit for deciding a coring value based on a mean luminance level of the input image signal or on a gain of an AGC circuit; and
   a coring circuit of which a coring value is controlled by an output from said coring decision circuit and which accomplishes a coring operation on an output from said motion vector computing circuit.

* * * * *